INVENTORS.
GROVER K. HOUPT
VERNON WHITTAKER

Nelson E. Kimmelman
ATTORNEY

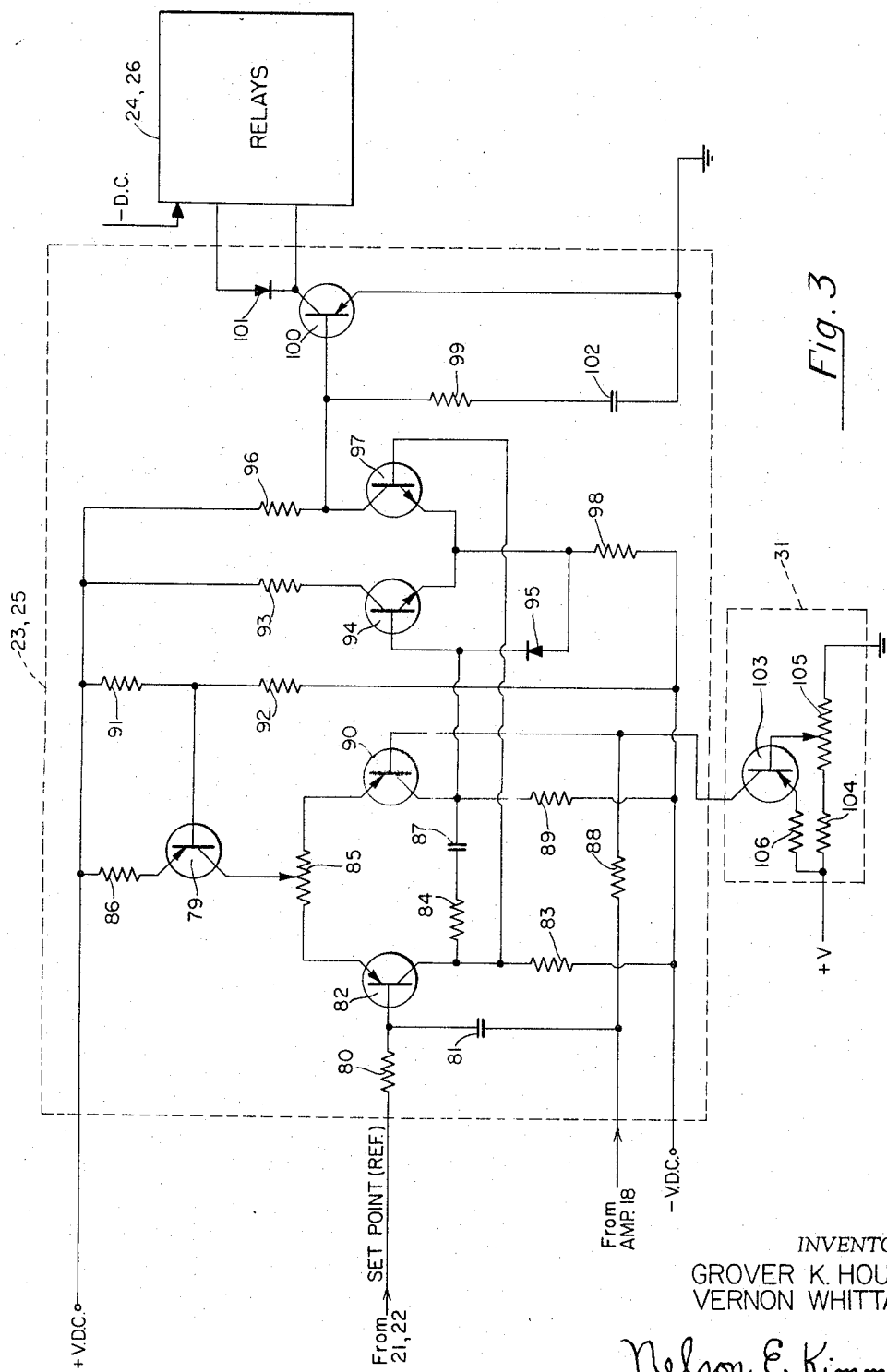

United States Patent Office 3,354,399
Patented Nov. 21, 1967

3,354,399
AMPLITUDE AND POLARITY SENSITIVE CONTROL SYSTEM
Grover K. Houpt, Lansdale, and Vernon Whittaker, Hatboro, Pa., assignors to Automatic Timing and Controls, Inc., King of Prussia, Pa.
Filed June 23, 1964, Ser. No. 377,228
4 Claims. (Cl. 328—147)

ABSTRACT OF THE DISCLOSURE

A source of regulated DC voltage is connected to an oscillator of the type which produces an output signal whose amplitude is proportional to the DC voltage. The output of the oscillator may be coupled to a condition-sensing device which produces an output signal whose amplitude and polarity changes as a function of the change in condition. The latter output signal is demodulated and applied as the first input to one or more voltage comparators. The original regulated DC voltage is applied as the second input. The comparator produces an error signal which is used to actuate an associated utilization device.

---

This invention relates to a control system and in particular to a DC input-DC output control system associated with a force transducer for operating a selected number of utilization circuits in response to the DC output.

It is an object of this invention to employ DC circuits associated with the input and output of transducers such as differential transformers so as to avoid undesired quadrature effects which produce inaccuracies and instabilities in AC circuits.

Another object of this invention is to provide a DC input-DC output system associated with transducers such as differential transformers which produces an amplified DC output signal that is used to control a number of utilization circuits designed to operate at different levels of that output signal.

Still other objects of the invention will be apparent upon perusal of the drawings, specification and claims herein.

In accordance with the present invention, a novel control system is provided which converts an input DC voltage to a bidirectional signal which is applied to the primary of a transducer such as a differential transformer. In the secondary of the differential transformer an AC signal is produced which is then demodulated thereby producing a DC output signal. This output signal is then amplified and compared with a signal derived from the input DC voltage in one or more signal comparison means. A utilization circuit such as a relay is coupled to each comparison means and when the value of the output signal deviates from the value of the derived signal by a predetermined amount, the utilization circuit is actuated or inactivated as the case may be. Different utilization circuits may be designed to operate at different values of the output signal.

FIGURE 3 is principally a schematic circuit diagram of part of the system shown in FIG. 1 with an additional optional subcircuit.

Figure 1:
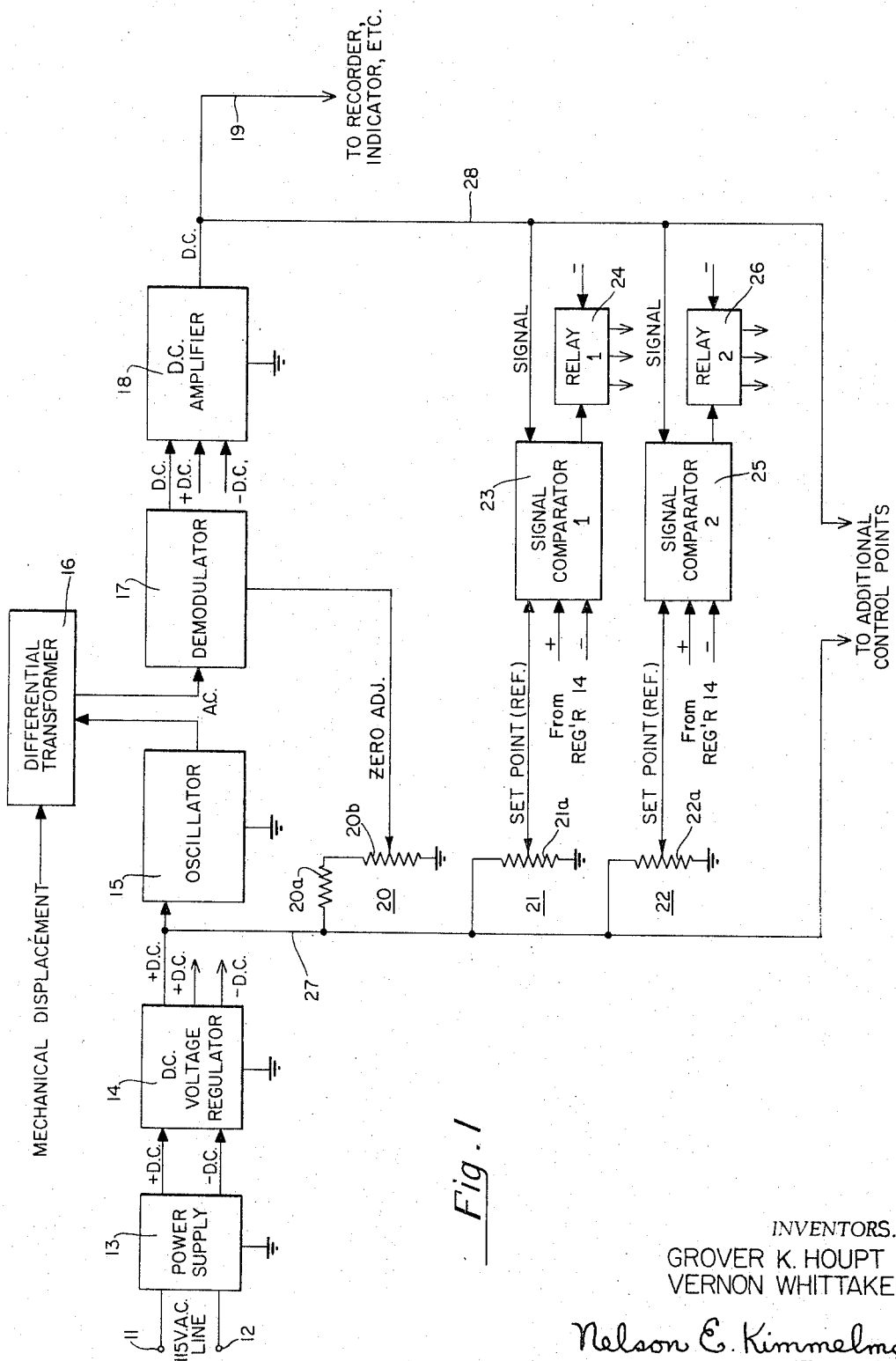
FIGURE 1 is a block and schematic diagram of a system constructed in accordance with the present invention.

Referring to FIG. 1, line voltage is applied at terminals 11 and 12 to a power supply 13 which provides plus and minus DC voltages to a voltage regulator 14. The voltage regulator produces a regulated positive reference input DC voltage which is applied to an oscillator 15 and to a lead 27 for use with a zero adjust circuit 20, and set point circuits 21 and 22. The oscillator 15 converts the applied DC to an AC which energizes the primary of a differential transformer 16. Depending upon the displacement of the armature of the transformer 16 from its "null position," there will be induced in its secondary windings AC voltages which are applied to a demodulator 17. There they are converted to corresponding DC output voltages whose polarity and amplitude depends upon the direction and distance of armature movement.

The demodulated signal is amplified in DC amplifier 18 and applied to appropriate recorders, indicators, etc., via lead 19. It is also applied via lead 28 to provide an error signal input to a desired number of signal comparators 23 and 25. The reference DC input voltage is applied to other inputs of the signal comparators 23 and 25 from the lead 27 via the set point circuits 21 and 22. If the desired relationship does not exist between the set point or reference voltages and the amplified DC output signals applied to the comparators, the latter are constructed to actuate utilization circuits such as relays 24 and 26 respectively. By using this type of system, the undesired quadrature effects of pure AC systems are avoided. Also, even though the input is regulated somewhat, such regulation is not really critical because any variations therein will also be manifested in the DC output of the amplifier 18 so that these effects will tend to balance out in the comparators. Of course, any desired number of circuits may be connected between leads 27 and 28 depending on the amplitude of the DC signal produced at the output of amplifier 18 and on the output impedance of the latter. Preferably, it should have a low output impedance to enable it to drive a number of circuits without interaction between them. Alternatively, however, the circuits driven by the amplifier 18 could each have a high impedance to avoid interaction between them.

Figure 2:
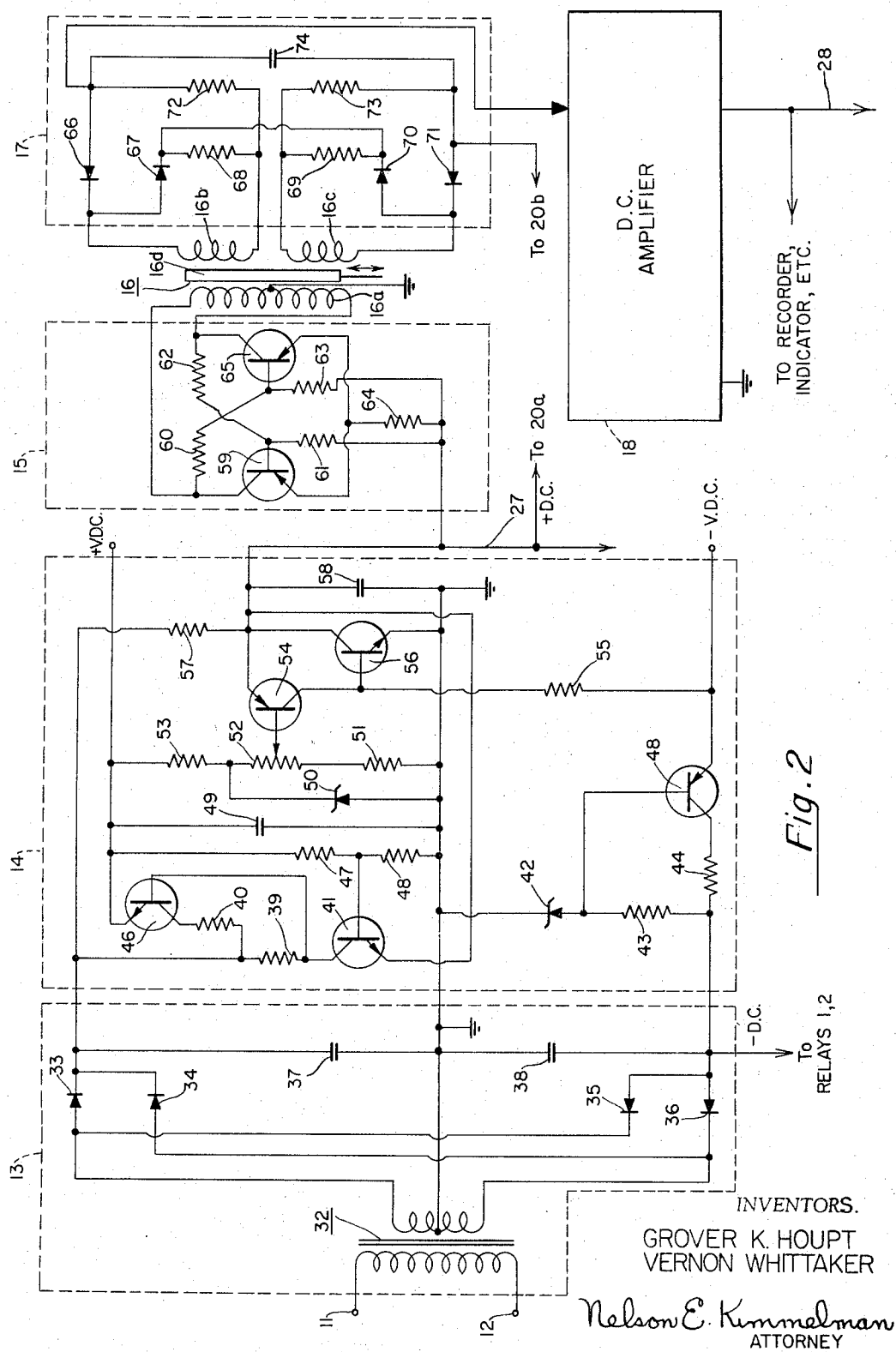
FIGURE 2 is principally a schematic circuit diagram of part of the system shown in FIG. 1.

Referring to FIGURE 2, the 115 volt AC line input is applied to terminals 11 and 12 connected to the primary of a transformer 32. The secondary of that transformer is center-tapped to ground and one end is connected to the anode of diode 33 and to the cathode of diode 35. Conversely, the other end of the secondary is connected to the cathode of diode 36 and to the anode of diode 34. Thus, whenever the upper end of the secondary is positive, diode 33 will conduct, whereas the lower end, being negative, will cause diode 36 to conduct, but in the opposite direction. When the upper end of the secondary is negative, diodes 34 and 35 will conduct in their indicated directions. Thus, diodes 33 and 34 will produce a positive unregulated DC with the capacitor 37 acting as a filter. When diodes 35 and 36 conduct, they will produce a negative unregulated DC, which is filtered by the capacitor 38. There are in this circuit effectively two power supplies connected to the same transformer through the center tap on transformer 32.

Voltage regulator 14

These unregulated DC voltages are applied to the DC voltage regulator 14, which is constructed to produce three regulated output DC voltages, one being a minus DC voltage, and the other two being plus DC voltages. In this circuit the transistors 41 and 46 are used to produce a regulated positive voltage at the terminal marked "+V.D.C." The emitter of transistor 41 is connected to the positive voltage appearing on the lead 27 which is regulated in a manner to be explained below and thus acts as the reference voltage point. The voltage from the lead marked +V.D.C. is divided by the dividing network consisting of the series-connected resistors 47 and 48. Their junction is connected to the base of the transistor 41 which acts as a differential amplifier. That is to say, any difference between the base and emitter voltage by which the base becomes more positive than the emitter reference voltage will result in increased conduction in the emitter-collector circuit of the transistor 41. If the base of transistor 41 goes more positive this means that the terminal +V.D.C. is going too positive. The consequent increase in current through the resistor 39 causes the base of the transistor 46 to become more negative. Since transistor 46 is connected as an emitter-follower the emitter voltage will also go more negative thereby tending to correct the increase at +V.D.C. The Zener diode 50 acts to regulate the voltage appearing between the junction of the resistors 53 and 52 and ground. The resistor 40 is a current-limiting resistor which will protect transistor 46 in the event that its emitter is connected to a short or overloaded circuit. Condenser 49 is inserted to prevent oscillation that might arise in the feedback loop between transistors 41 and 46.

The voltage appearing on the lead 27 is a regulated positive voltage which is applied to the zero adjust circuit 20 and to the set point circuits 21 and 22, as shown in FIG. 1. As stated above this voltage acts as a reference for transistor 41. It is itself regulated by the combined action of transistors 54 and 56 and their associated components. The voltage appearing across the potentiometer 52 is stabilized by virtue of the voltage regulation of terminal +V.D.C. as explained above. Thus it is useful in the voltage comparison which is effected by the transistor 54. The voltage appearing across the resistor 57 is applied to the emitter of the transistor 54 and compared with the base voltage thereof as determined by the setting on the potentiometer 52. If there is a difference between these two voltages, insofar as the emitter becomes more positive current will flow in the emitter-collector circuit of transistor 54 causing a voltage drop across the resistor 55 and making the base of the transistor 56 more positive. Therefore, the transistor 56 will have increased current in its emitter-collector circuit with the result that more current will be drawn through the resistor 57, making its junction with the emitter of the transmitter 54 go more negative. Conduction through the transistor 54 will thereupon diminish toward the desired level so that transistor 54's emitter voltage tends to return to its former value. Thus, the voltage appearing on the lead 27 will be regulated. The condenser 58 is a stabilizing capacitor tending to prevent oscillation that might result from the feedback loop between the transistors 54 and 56.

The Zener diode 50 actually operates to stabilize the voltage on +V.D.C. and on lead 27 by virtue of its strategic placement as shown. The fact that the cathode of the Zener diode 50 is connected to a reference voltage terminal +V.D.C. means that constant current is supplied through it which is desirable because it makes its performance as a voltage reference more stable. Condenser 49, like the condenser 58 is a stabilizing condenser which tends to prevent oscillation in the feedback loops.

To provide the minus DC regulated output at terminal "−V.D.C." the transistor 48 has its collector connected via the current-limiting resistor 44 to the diodes 35 and 36 and also to dropping resistor 43 which is connected through Zener diode 42 to ground. When current is drawn through diodes 35 and 36 it will produce a voltage drop across resistor 43 making the base of transistor 48 negative. Since transistor 48 is an emitter-follower, its emitter will also go negative. Zener diode 42 regulates the voltage between ground and the junction of diodes 35 and 36.

Oscillator 15

The positive voltage appearing on the lead 27 is applied, as mentioned previously in connection with the explanation of FIG. 1, to the zero adjust circuit 20 as well as the set point circuits 21 and 22. It is also applied to oscillator 15 by way of resistors 61 and 63 to the bases of the transistors 59 and 65 and through a resistor 64 to both emitters of those transistors. The oscillator 15 resembles a conventional solid-state multivibrator except that it uses mutual inductive coupling through the primary 16a of the differential transformer 16. The primary 16a acts as an autotransformer. It will be assumed that initially one, say transistor 59, of the two transistors 59 and 65 is "on." Since transistor 65 is "off" its collector is negative with respect to the emitter. Initially the current through the base of this transistor 59 will be sufficient to keep it on. However, as current builds up in the upper half of the primary 16a, the gain or beta of the transistor 59 is not high enough to keep it "on." At this change in the rate of change in the current build-up of current in 16a, the bottom end of the latter goes more positive so less current goes through resistor 62 to the base of transistor 59 so the latter is switched off and transistor 65 goes on whereupon the same action ensues until the transistors are switched again. Current through the primary 16a is a saw-tooth but the voltage induced in the secondary is approximately a square wave. The resistor 64 provides for current feedback and stabilizes the voltage produced in the secondary of the differential transformer 16.

Demodulator 17

As in any conventional differential transformer, movement of the armature 16d away from its "null" position will result in the production of a voltage across its secondaries whose polarity and amplitude is a function of the direction and amount of armature displacement. The voltages induced in the secondary windings 16b and 16c are applied to what may be considered as two separate full wave rectifier circuits.

During one-half cycle it will be assumed that the voltage at the upper end of winding 16b is plus and negative at its lower end. The polarities on the secondary winding 16c are just the opposite due to their direction of winding. As a result, current will flow through the diode 67 and through resistor 68 developing a voltage across the latter which is applied via resistor 72 to the DC amplifier 18. Simultaneously, current will flow through the diode 70 and the resistor 69, and a voltage will be developed which is applied via the resistor 73 to the other output lead which goes to the zero adjust circuit 20.

During the next half cycle all polarities will be reversed and the diodes 66 and 71 will conduct developing voltages across resistors 72 and 73 respectively which are applied to the two output leads from the demodulator. The condenser 74 acts to smooth the DC outputs at both of its connection points to the circuit. The outputs are not tied to ground. Each half of the demodulator circuit 17 provides full-wave rectification without using the customary four-diode bridge. Furthermore, there is no necessity for a center-tapped transformer; the secondaries 16b and 16c are not directly connected to one another electrically.

One output lead of the demodulator is connected to the zero adjust circuit 20 via the slider of a potentiometer 20b which is in series with a resistor 20a, both resistances being connected between the lead 27 and ground. This enables a desired value of direct current, depending on the setting of potentiometer 20b, to be superimposed upon the demodulator output to compensate for undesired values of the zero or null voltage produced in the secondaries of the differential transformer 16 when the armature 16d is at the electrical center position therein.

The DC at the junction of diode 66 and resistor 72 is then applied to a conventional DC amplifier 18 and from there via lead 28 to the various circuits connected to that lead as shown in FIG. 1. Also, it may be applied to any desired recorder or indicator via lead 19.

As stated above the condenser 74 is a DC smoothing condenser. In so doing, it adjusts the speed at which the system reacts to a change in the position of the armature of the differential transformer and thereby prevents undesired "chatter" of the contacts in relays 24 and 26. This type of speed response adjustment can only be made easily in a DC system such as the one explained herein. Such an adjustment in an AC system would require relatively complicated and expensive circuitry.

*Signal comparators*

The DC amplifier output on lead 28 is a signal which may be compared with a number of other signals derived from the regulated DC input signal on lead 27. These derived signals are determined by the settings of the potentiometers 21a and 22a in the set point circuits 21 and 22. This comparison is accomplished in signal comparators 23 and 25, for example, whose outputs, in turn, control their associated relays 24 and 26 or any other utilization circuits. One signal comparator which has been found to be highly effective is shown in FIG. 3. The amplified DC output signal is applied from lead 28 to the base of transistor 90. The reference voltage from the set point circuit 21 is applied via resistor 80 to the base of transistor 82. Condenser 81 filters any ripple out of the DC output signal and also acts somewhat to slow down the response of the circuit.

The two transistors 82 and 90 form a differential amplifier. Transistor 79 is connected to a source of positive regulated DC (such as regulator 14) and current passing through its emitter-collector circuit is distributed via potentiometer 85 to the emitters of transistors 82 and 90. The potentiometer 85 is set so that when the set point voltage is equal to the amplified signal voltage, the associated relay is on the point of triggering. Any difference in the signal supplied to the respective bases of transistors 82 and 90 will control the current through them and determine the voltages developed across their collector load resistors 83 and 89. It will be noticed that the bases of transistors 94 and 97 are coupled to the respective collectors of the transistors 82 and 90. Therefore, voltages developed across the load resistors 83 and 89 will affect the conduction of transistors 94 and 97. Changes in the currents through the two transistors 97 and 94 will develop corresponding voltages across resistor 96. Since the base of the output transistor 100 is connected to resistor 96, the conductivity of transistor 100 will be a function of the varying currents drawn through resistor 96.

Condensers 87 and 102 act, like condenser 81, to slow down the response of the circuit somewhat and to filter out any ripple voltage from the DC in the circuit.

The optional circuit 31 shown in FIG. 3 has been devised to eliminate errors which may arise when the transducer is used in connection with a weighing system having a hopper to which a certain amount of poundage is to be delivered. Some provision should be made for the fact that some of the material being delivered to the hopper will be in suspension at the time the delivery circuit is inactivated by operation of the relay. A circuit such as circuit 31 enables the system to compensate for this fact so that the relay becomes responsive at a predetermined setting of the set point circuit which corresponds to nine hundred ninety pounds, say, rather than the nominal one thousand pounds.

The circuit 31 comprises a transistor 103 whose collector is connected to the base of transistor 90, whose emitter is connected via a current-regulating resistor 106 to a source of positive DC voltage "+V" and whose base is connected to the slider of a potentiometer 105. The latter potentiometer is connected between ground and a resistor 104 which is also connected to +V. Its operation is based on the fact that any current drawn through the resistor 88 will change the voltage on the base of the transistor 90 whose action in the circuit has previously been explained. Therefore, the connection of transistor 103 to the base of transistor 90 enables a desired amount of current in that base to be diverted through the transistor 103 depending upon the positive voltage applied to the latter's base via potentiometer 105 and resistor 104.

A circuit constructed in accordance with FIGS. 1, 2 and 3 herein performed highly satisfactorily with the following values of the components therein:

| Component No.: | Value, etc. |
| --- | --- |
| 33 | 1N537 |
| 34 | 1N537 |
| 35 | 1N537 |
| 36 | 1N537 |
| 37 | 1000 mfd. |
| 38 | 1000 mfd. |
| 39 | 470 ohms |
| 40 | 4.7 ohms |
| 41 | 2N2711 |
| 42 | CR 601 |
| 43 | 220 ohms |
| 44 | 33 ohms |
| 45 | 2N1183 |
| 46 | 2N2270 |
| 47 | 350 ohms |
| 48 | 475 ohms |
| 49 | 10 mfd. |
| 50 | CR 601 |
| 51 | 1000 ohms |
| 52 | 100 ohms |
| 53 | 430 ohms |
| 54 | 2N4041 |
| 55 | 3900 ohms |
| 56 | 2N2270 |
| 57 | 40 ohms |
| 58 | 100 mfd. |
| 59 | 2N526 |
| 60 | 1330 ohms |
| 61 | 1000 ohms |
| 62 | 1330 ohms |
| 63 | 1000 ohms |
| 64 | 15 ohms |
| 65 | 2N526 |
| 66 | 1N3604 |
| 67 | 1N3604 |
| 68 | 3010 ohms |
| 69 | 3010 ohms |
| 70 | 1N3604 |
| 71 | 1N3604 |
| 72 | 3010 ohms |
| 73 | 3010 ohms |
| 74 | .22 mfd. |
| 79 | 2N404A |
| 80 | 270 ohms |
| 81 | .2 mfd. |
| 82 | 2N404A |
| 83 | 15,000 ohms |
| 84 | 10 ohms |
| 85 | 500 ohms |
| 86 | 6800 ohms |
| 87 | .01 mfd. |
| 88 | 470 ohms |
| 89 | 15,000 ohms |
| 90 | 2N404A |
| 91 | 3900 ohms |
| 92 | 15,000 ohms |
| 93 | 12,000 ohms |
| 94 | 16A1 |
| 95 | 1N34 |
| 96 | 12,000 ohms |
| 97 | 16A1 |
| 98 | 2200 ohms |
| 99 | 10 ohms |
| 100 | 2N404A |
| 101 | CR 501 |
| 102 | .2 mfd. |

We claim:
1. A control system for use with a variable transducer which modifies an input signal thereto as a function of a change in condition therein to produce an output signal, said system comprising:
 (a) a source of a predetermined DC voltage,
 (b) means coupled to said source for producing in response thereto an AC signal whose amplitude corresponds to the amplitude of said DC voltage, said producing means supplying said AC signal as the input to said transducer,
 (c) means adapted to be coupled to said transducer for converting the output signal thereof to an output DC voltage corresponding thereto, and
 (d) means to which said predetermined DC voltage and said output DC voltage are applied for controlling the operation of at least one utilization circuit in response to said applied DC voltages.

2. A control system comprising:
 (a) a source of a predetermined DC voltage,
 (b) means coupled to said source for producing in response to said DC voltage an AC signal whose amplitude corresponds to the amplitude of said DC voltage,
 (c) an electrical transducer which modifies an AC signal input thereto as a function of a change in condition therein to produce an output AC signal, said transducer being coupled to receive said first-named AC signal,
 (d) means coupled to said transducer for demodulating said output AC voltage thereby to produce an output DC voltage corresponding to the change in condition of said transducer, and
 (e) means to which said predetermined DC voltage and said output DC voltage are applied for controlling the operation of at least one utilization circuit in response to a comparison of said applied DC voltages.

3. A control system comprising:
 (a) a source of a predetermined DC voltage,
 (b) an oscillator for generating an oscillatory signal in response to said DC voltage, said generated signal being proportional in amplitude to said DC voltage,
 (c) a differential transformer having a primary winding to which said oscillatory signal is applied, said transformer also having at least one secondary winding for producing an output oscillatory signal whose polarity and amplitude vary as a function of the displacement of the armature therein,
 (d) demodulating means to which said output oscillatory signal is applied, said demodulating means producing an output DC voltage which varies in amplitude proportional to said oscillatory output signal,
 (e) comparison means to which said predetermined DC voltage and said output DC voltage are applied for comparing said applied voltages and producing a difference signal, and
 (f) utilization means coupled to said comparison means and which is responsive to said difference signal.

4. The system according to claim 3 wherein there are a plurality of signal comparison means to each of which said output DC voltage is applied and a different predetermined amplitude portion of said predetermined DC voltage is applied and in which there are a corresponding number of said utilization means respectively associated with said plurality of comparison means.

References Cited

UNITED STATES PATENTS

| | | | |
|---|---|---|---|
| 2,648,058 | 8/1953 | Breedlove | 340—199 |
| 2,824,299 | 2/1958 | Haines et al. | |
| 3,046,535 | 7/1962 | Philbin et al. | 340—199 |
| 3,100,889 | 8/1963 | Cannon | 340—199 X |
| 3,204,229 | 8/1965 | Dulberger | 340—196 |

ARTHUR GAUSS, *Primary Examiner.*

DAVID J. GALVIN, *Examiner.*

S. D. MILLER, JR., *Assistant Examiner.*